Oct. 19, 1948.     J. BUCKLEY     2,451,470
VEHICLE ANCHOR DEVICE
Filed May 8, 1947
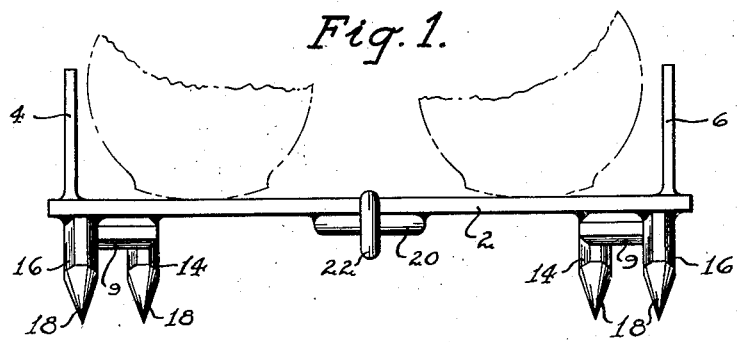
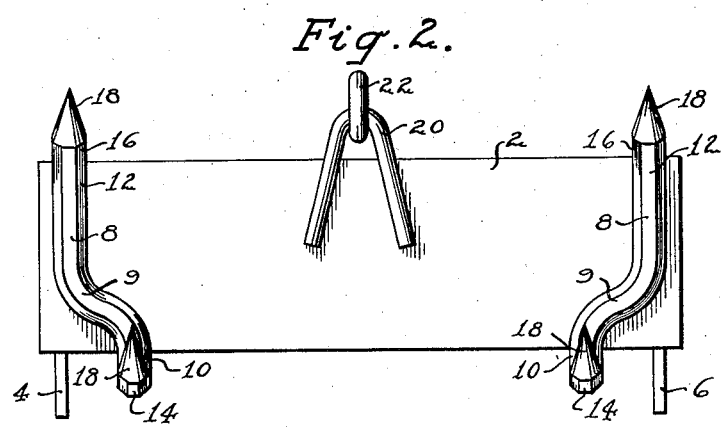
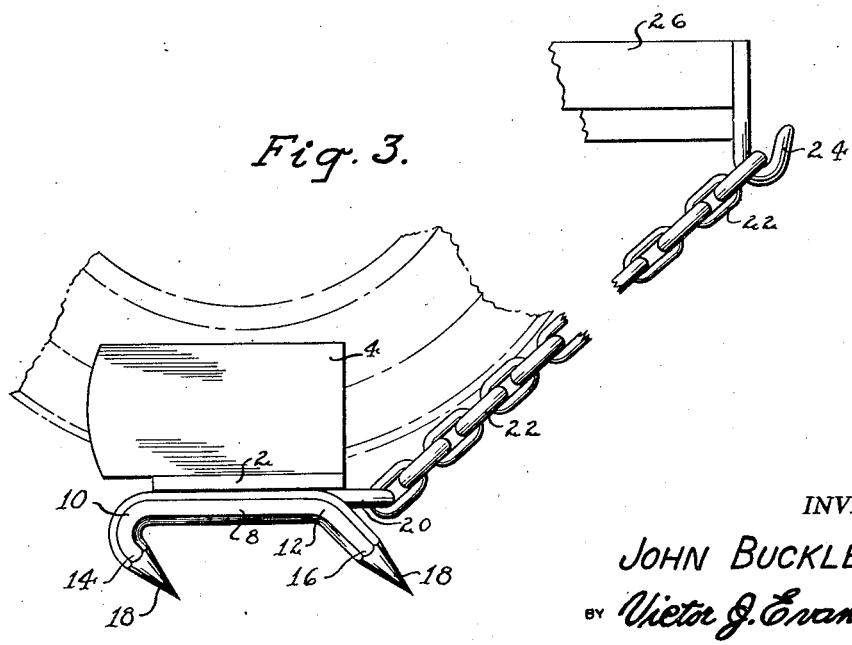
INVENTOR.
JOHN BUCKLEY
BY *Victor J. Evans & Co.*
ATTORNEYS Patented Oct. 19, 1948

2,451,470

UNITED STATES PATENT OFFICE 2,451,470

VEHICLE ANCHOR DEVICE

John Buckley, Georgetown, Colo.

Application May 8, 1947, Serial No. 746,728

2 Claims. (Cl. 188—4)

My present invention relates to an improved vehicle anchor device of the type especially adapted to insure the stationary position of vehicles such as crane trucks or wrecking trucks in the operation of which as when pulling heavy loads are subjected to great strain which oftentimes will move the vehicle rather than the load.

When wrecking trucks are employed to pull a wrecked automobile from a ditch, unless the truck is anchored, the strain of the winch pull may move the truck rather than the auto, and it is the especial purpose of my invention to afford a simple device which may be attached to the truck and placed under the tire treads so that movement of the truck in one direction is impossible.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a rear elevational view of the device of my invention.

Fig. 2 is a bottom plan view.

Fig. 3 is a side elevational view showing the device in position and secured to the truck body.

Referring now to the drawings wherein I have illustrated the present preferred embodiment of my invention, I employ a base 2 of heavy metal preferably rectangular in shape and having side walls 4 and 6.

Under the base I secure as by welding a pair of heavy rods 8 offset at 9 and having their ends bent at 10 and 12 respectively so that the ends forming painted prongs 14 and 16 are angularly disposed from the vertical and lie in planes parallel to each other.

The ends are tapered at 18 to effect penetration of soft ground and surface contact as on paved highways. A yoke 20 is also secured under the base to which is attached a chain 22, the other end of which is adapted to be secured to a hook 24 on the truck body 26.

In use the device is used in pairs, one for each rear wheel, or pair of rear wheels. The chains are secured to the body, and the devices are placed on the ground or highway with the bent rods down and the points directed to the rear, or toward the chain hooks.

The vehicle is then driven so that the rear wheels will ride onto the bases of the pair of devices until the chains are taut.

Then as usual, the crane or winch may be used to pull a load toward the truck and the rear wheels will be held stationary due to the immobility of the bases and the truck cannot creep or move.

When the pulling job is finished the truck may be driven forwardly off the bases and the chains unhooked.

From the above description it will be apparent that the device of my invention is simple to manufacture and use and will afford an inexpensive and durable means of holding a truck stationary under circumstances as outlined.

Having thus fully described my invention what I claim as new and desire to secure by Letters Patent is:

1. In an anchoring device for motor vehicles, a base plate adapted to be positioned for tires of a wheel to roll thereon, a yoke mounted on the under surface of the base plate intermediate of the ends thereof and forming a forwardly extending eye, a chain secured in the eye of the yoke and adapted to be secured to a forward part of the vehicle, and relatively heavy rods mounted on the under surface of the base and spaced inwardly from the ends thereof, said rods having forwardly and downwardly extending prongs on the forward ends thereof and offset inwardly toward the rear of the base with forwardly and downwardly extending prongs on the rear ends thereof wherein the prongs on the rear ends are offset inwardly from the prongs on the forward ends of the rods.

2. In an anchoring device for motor vehicles, a base plate adapted to be positioned for tires of a wheel to roll thereon, transversely positioned upwardly extending side plates spaced inwardly from the ends of the base, a yoke mounted on the under surface of the base intermediate of the ends thereof and forming a forwardly extending eye, a chain secured in the eye of the yoke and adapted to be secured to a forward part of the vehicle, and relatively heavy rods spaced inwardly from the ends of the base mounted on the under surface thereof and having forwardly and downwardly extending pointed prongs on the forward ends thereof, said rods offset inwardly toward the rear of the base and also carrying forwardly and downwardly extending pointed prongs on the rear ends thereof with the prongs on the rear ends of the rods offset inwardly in relation to the prongs on the forward ends thereof.

JOHN BUCKLEY.

REFERENCES CITED

The following references are of record in the file of this patent:

UNITED STATES PATENTS

| Number | Name | Date |
| --- | --- | --- |
| 696,159 | Best | Mar. 25, 1902 |
| 2,151,014 | Curtiss | Mar. 21, 1939 |
| 2,344,148 | Jackson | Mar. 14, 1944 |

FOREIGN PATENTS

| Number | Country | Date |
| --- | --- | --- |
| 192,947 | Switzerland | Sept. 15, 1937 |
| 411,814 | France | Apr. 15, 1910 |